US012609566B2

(12) United States Patent
Lambourne et al.

(10) Patent No.: US 12,609,566 B2
(45) Date of Patent: Apr. 21, 2026

(54) MAGNETISATION AND DEMAGNETISATION OF A COMPONENT

(71) Applicant: ROLLS-ROYCE plc, London (GB)

(72) Inventors: Alexis Lambourne, Derby (GB); Christopher D Riley, Derby (GB)

(73) Assignee: ROLLS-ROYCE PLC, London (GB)

( * ) Notice: Subject to any disclaimer, the term of this patent is extended or adjusted under 35 U.S.C. 154(b) by 284 days.

(21) Appl. No.: 18/602,254

(22) Filed: Mar. 12, 2024

(65) Prior Publication Data

US 2024/0339897 A1     Oct. 10, 2024

(30) Foreign Application Priority Data

Apr. 6, 2023    (GB) ...................................... 2305114

(51) Int. Cl.
| | |
|---|---|
| *H01F 13/00* | (2006.01) |
| *H02K 1/2783* | (2022.01) |
| *H02K 11/01* | (2016.01) |
| *H02K 15/50* | (2025.01) |

(52) U.S. Cl.
CPC ......... *H02K 1/2783* (2022.01); *H01F 13/003* (2013.01); *H02K 11/012* (2020.08); *H02K 15/50* (2025.01)

(58) Field of Classification Search
CPC .... H02K 15/50; H02K 11/012; H02K 1/2783; H02K 15/03; H01F 13/003; H01F 13/006
See application file for complete search history.

(56) References Cited

U.S. PATENT DOCUMENTS

| | | |
|---|---|---|
| 2006/0220484 A1 | 10/2006 | Stephens |
| 2009/0009012 A1 | 1/2009 | Stephens et al. |
| 2011/0088249 A1* | 4/2011 | Stephens ................ H02K 1/278 |
| | | 29/598 |

FOREIGN PATENT DOCUMENTS

| | | |
|---|---|---|
| CN | 113903542 A | 1/2022 |
| CN | 115188557 A | 10/2022 |
| WO | 2014/187792 A1 | 11/2014 |

OTHER PUBLICATIONS

Sep. 25, 2024 Extended European Search Report issued in European Patent Application No. 24162000.4.
Bunting E-Magnets "Characteristics of NDFEB Magnets, Neodymium Magnets," The Original Online Magnet Company, 7 pages, online: https://web/20230118142624/https://e-magnetsuk.com/introduction-toneodymium-magnets/characteristics-of-ndfeb-magnets/.
Vacodym • Vacomax "Rare Earth Permanent Magnets," Advanced Materials The Key to Progress, 72 pages, online: https://web.archive.org/web/20230118143719/https://vacuumschmelze.com/03_Documents/Brochures/VACODYM-VACOMAX%20en.pdf.
Sep. 27, 2023 Combined Search and Examination Report issued in Great Britain Application No. GB2305114.7.

* cited by examiner

*Primary Examiner* — Mohamad A Musleh
(74) *Attorney, Agent, or Firm* — OLIFF PLC

(57)    ABSTRACT

A method of magnetising or demagnetising an annular component for a rotary machine, a flux arrangement for performing a magnetising or demagnetising method, and a flux assembly for such a flux arrangement; wherein, the annular component includes an alternating arrangement of radial elements and angular elements for forming a Halbach array. A magnetizer is caused to induce magnetic flux in a primary set of elements of the annular component including a primary radial element and an adjacent primary angular element. A shield element shields a secondary angular element of the annular component from magnetic flux from the magnetizer.

17 Claims, 7 Drawing Sheets

300

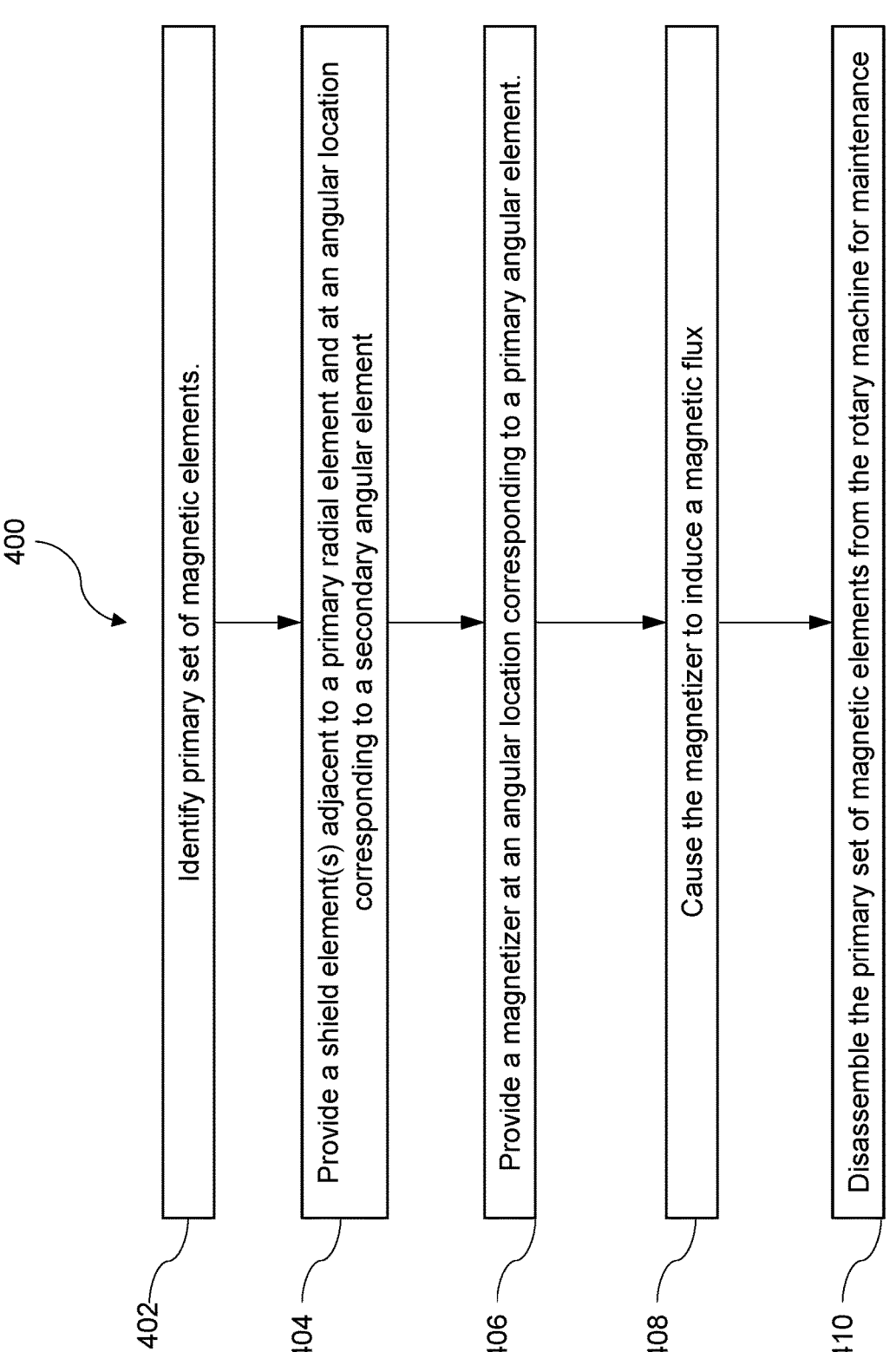

400

Identify primary set of magnetic elements.

402

Provide a shield element(s) adjacent to a primary radial element and at an angular location corresponding to a secondary angular element

404

Provide a magnetizer at an angular location corresponding to a primary angular element.

406

Cause the magnetizer to induce a magnetic flux

408

Disassemble the primary set of magnetic elements from the rotary machine for maintenance

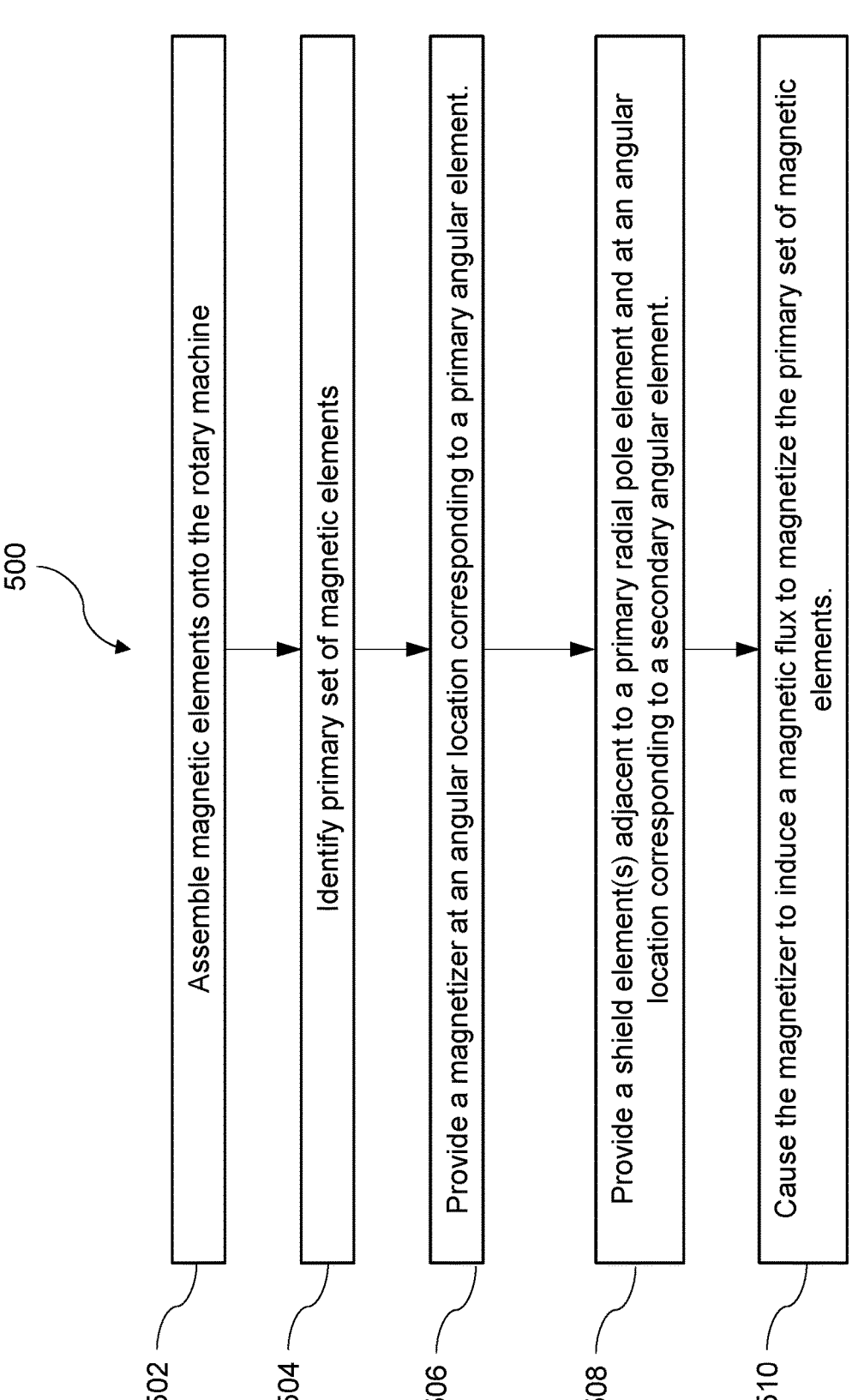

502   Assemble magnetic elements onto the rotary machine

504   Identify primary set of magnetic elements

506   Provide a magnetizer at an angular location corresponding to a primary angular element.

508   Provide a shield element(s) adjacent to a primary radial pole element and at an angular location corresponding to a secondary angular element.

510   Cause the magnetizer to induce a magnetic flux to magnetize the primary set of magnetic elements.

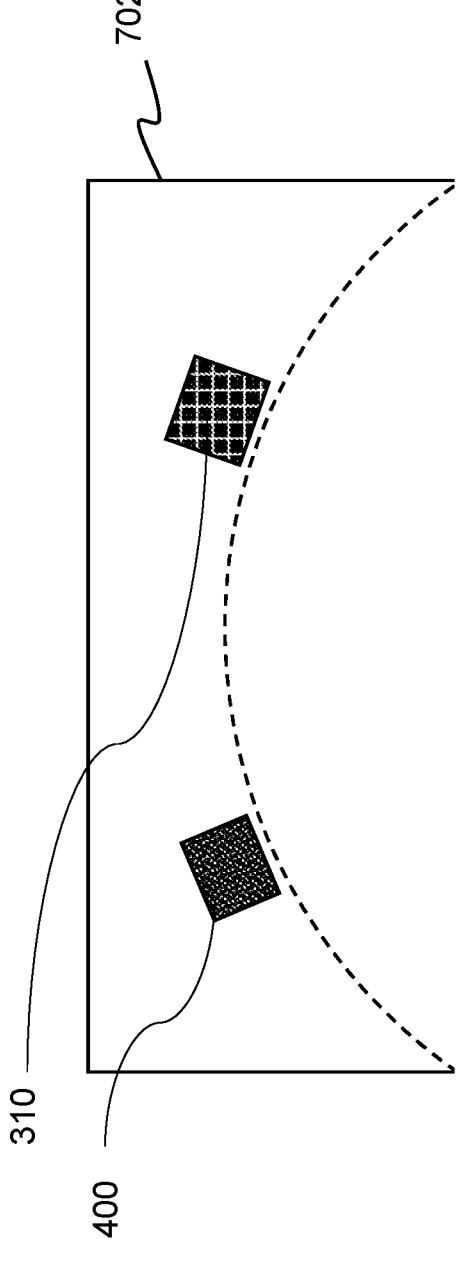
FIG. 7

MAGNETISATION AND
DEMAGNETISATION OF A COMPONENT

This specification is based upon and claims the benefit of priority from UK Patent Application Number 2305114.7 filed on 6 Apr. 2023, the entire contents of which are incorporated herein by reference.

BACKGROUND

Technical Field of the Disclosure

The invention relates to methods of magnetising or demagnetising an annular component for a rotary machine, and a magnetising arrangement.

Background of the Disclosure

It is known to magnetise and demagnetise elements of a permanent magnet component, such as a permanent magnet rotor for use in an electric machine. Known methods include pulse magnetisation and pulse demagnetisation, in which one or more magnetizers are controlled to cause magnetic flux in elements of the component to cause either magnetisation or demagnetisation of the respective elements. In the case of a permanent magnet rotor, it is known to conduct a magnetisation or demagnetisation operation for all elements of a permanent magnetic rotor at once, for example in a single pulse magnetisation or single pulse demagnetisation process.

Simultaneous magnetisation or demagnetisation of a plurality (e.g. all) elements of a component may present practical difficulties, particularly with increasing component size. In particular, there may be practical limitations or difficulties associated with the design and configuration of an arrangement of magnetizers for such a magnetisation or demagnetisation operation, with complexity and cost of power electronics components scaling with size.

The manufacture (e.g. assembly) and repair or maintenance of permanent magnetic rotors requires access to suitable magnetizers for magnetisation and/or demagnetisation operations. It is considered that many permanent magnet rotors may not be designed or commissioned on the basis of a requirement for future servicing and repair, which may require demagnetisation and subsequent magnetisation.

SUMMARY OF THE DISCLOSURE

According to a first aspect there is disclosed a method of magnetising or demagnetising an annular component for a rotary machine, the annular component comprising an alternating arrangement of radial elements and angular elements for forming a Halbach array in which the elements have respective radial and angular magnetic orientation directions, the method comprising:

causing a magnetizer to induce magnetic flux in a primary set of elements of the annular component comprising a primary radial element and an adjacent primary angular element;

wherein the magnetizer is disposed at an angular location corresponding to the primary angular element; and a shield element shielding a secondary angular element of the annular component from magnetic flux from the magnetizer;

wherein the secondary angular element is adjacent to the primary radial element, and wherein the shield element is disposed at an angular location corresponding to the secondary angular element.

It may be that the shield element is disposed radially outward of the secondary angular element.

It may be that the primary set of elements of the annular component comprises the primary angular element and a plurality of primary radial elements.

It may be that the primary set of elements of the annular component comprises the primary angular element disposed between two primary radial elements.

It may be that the shield element comprises a shield material and each of the plurality of radial and angular elements of the component comprises a respective pole material. The electrical conductivity of the shield material may be greater than the electrical conductivity of the pole material of the primary radial element disposed between the primary angular element and the secondary angular element.

It may be that the shield material has an electrical conductivity greater than the electrical conductivity of each of the plurality of radial and angular elements of the component, for example greater than the electrical conductivity of each respective pole material associated with the plurality of radial and angular elements.

It may be that the shield element has an electrical conductivity of at least 9 MS/m, for example at least 25 MS/m or at least 30 MS/m. For example, the shield material may have an electrical conductivity of 9-63 MS/, for example between 20-63 MS/m, or 30-63 MS/m. By way of example, suitable materials for the shield material include silver 63 MS/m; copper (59.6 MS/m; aluminium 37.7 MS/m; iron 9.93×106 S/m.

The or each pole material may have an electrical conductivity of less than the shield material, for example 0.01-30 MS/m, 0.1-30 MS/m, for example between 0.01-10 MS/m, 0.1-10 MS/m, 0.1-5 MS/m, or 0.5-5 MS/m, or 0.5-2.5 MS/m.

It may be that the shield element comprises a shield material and each of the plurality of radial and angular elements of the component comprises a respective pole material. It may be that the thermal conductivity of the shield material is greater than the thermal conductivity of the pole material of the primary radial element disposed between the primary angular element and the secondary angular element.

It may be that the shield material has a thermal conductivity greater than the thermal conductivity of each of the plurality of radial and angular elements of the component, for example greater than the thermal conductivity of each respective pole material associated with the plurality of radial and angular elements.

It may be that the shield element has a thermal conductivity of at least 50 W/m K, for example at least 90 W/m K or at least 200 W/m K. The thermal conductivity of the shield element may be 50-413 W/m K, for example in the range 90-413 W/m K. By way of example, suitable materials include silver (403 W/m K); copper (413 W/m K); (Aluminium 273 W/m K); and iron 94 W/m K).

The or each pole material may have a thermal conductivity of less than 50 W/m K, for example between 5-50 W/m K or between 5-15 W/m K (which is a typical range of thermal conductivity for Nd—Fe—B alloy or Sm—Co alloy pole material.

The shield element may comprise (e.g. consist of) silver, copper, aluminium, or an alloy including any of these elements. The primary radial element between the primary and secondary angular elements may comprise (e.g. consist of) an Sm—Co alloy, an Nd—Fe—B alloy, an Al—Ni—Co alloy, or a ferrite magnetic material. The plurality of radial and angular elements of the component may comprise (e.g. consist of) an Sm—Co alloy, an Nd—Fe—B alloy, an Al—Ni—Co alloy, or a ferrite magnetic material It may be that there is an interface between the primary radial element and the secondary angular element, and wherein the shield element has a boundary at an angular location corresponding to the interface.

It may be that the primary angular element has a radial thickness, and the magnetizer may be radially spaced apart from the primary angular element by a field separation. The field separation may be no more than twice the radial thickness of the primary angular element. The field separation may be no more than the radial thickness of the primary angular element. There may be a radial gap between the magnetizer and the annular component (e.g. an air gap).

It may be that the magnetizer is caused to induce magnetic flux to demagnetize the primary set of elements in a demagnetisation operation; and the method may further comprise: conducting a maintenance operation for a maintenance element of the primary set of elements The maintenance operation may comprise: removing the maintenance element; and re-installing the maintenance element or installing a replacement maintenance element. The method may method further comprise: subsequently causing the magnetizer to induce a magnetic flux in the primary set of elements to magnetise the maintenance element in a magnetisation operation.

It may be that at least some radial or angular elements of the annular component remain in place during the maintenance operation and the subsequent magnetisation of the maintenance element. It may be that each such remaining element is not subject to a demagnetisation operation and thereby remains magnetised throughout the demagnetisation operation, maintenance operation and magnetisation operation conducted for the maintenance element.

The method may comprise a sequence of demagnetisation operations conducted for respective primary sets of elements of the annular component; and/or may comprise a sequence of magnetisation operations conducted for respective primary sets of elements of the annular component.

The annular component may be a rotor for a rotary machine.

According to a second aspect there is disclosed a magnetising arrangement comprising:

an annular component for a rotary machine, the annular component comprising an alternating arrangement of radial elements and angular elements for forming a Halbach array in which the elements have respective radial and angular magnetic orientation directions;

a flux assembly comprising:

a magnetizer configured to induce a magnetic flux in the elements of the annular component; and a shield element;

wherein the magnetizer and shield element are angularly spaced apart with respect to a centroidal axis of the annular component;

wherein the shield element is configured to present a barrier to inhibit magnetic flux in the annular component at an angular location corresponding to the shield element;

wherein the flux assembly is configured to be disposed relative to the annular component so that, with the magnetizer at an angular location corresponding to a primary angular element and the shield element at an angular location corresponding to a secondary angular element, the magnetizer is configured to induce magnetic flux in a primary set of elements comprising the primary radial element and an adjacent primary angular element, with the shield element shielding the secondary angular element from the magnetic flux.

It may be that the flux assembly comprises a common support structure which supports the magnetizer and the shield element and is configured to receive the annular component radially within the magnetizer and the shield element so that the centroidal axis of the annular component is coincident with a support axis of the support structure.

It may be that the magnetizer and the shield element are at a common radial position with respect to the support axis.

According to a third aspect there is provided a flux assembly for a magnetising arrangement in accordance with the second aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Exemplary embodiments will now be described, by way of example only, with reference to the following drawings, in which:

FIG. 5 is a flow chart of an example method for demagnetizing a primary set of magnetic elements of an example component;

FIG. 6 is a flow chart of an example method for magnetizing a primary set of magnetic elements of an example component; and FIG. 7 is a sectional front view of an example flux assembly.

DETAILED DESCRIPTION OF THE DISCLOSURE

Figure 1:
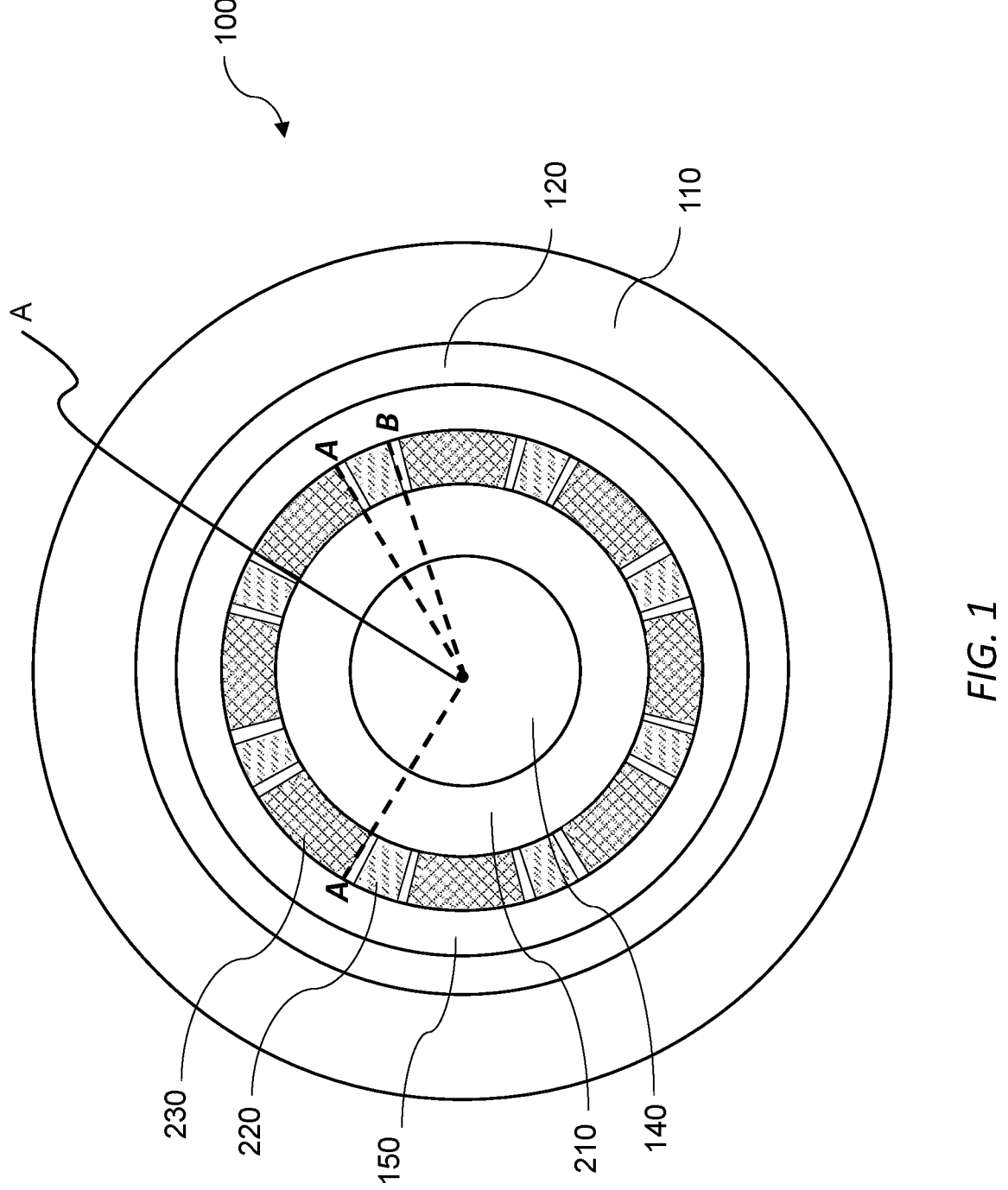
FIG. 1 is a sectional front view of an example rotary machine showing radial and angular magnetic elements of a rotor arranged in a Halbach array.

FIG. 1 shows an example rotary machine 100 comprising a shaft 140, a rotor back iron 210, and a plurality of magnetic elements 220, 230. The expression "back iron" is a term of the art related to magnetic rotary machines, and does not imply that it comprises or consists of iron. For example, the rotor back iron may comprise an axially-laminated stack of elements, for example comprising silicon steel (also known as electrical steel) or a cobalt-iron alloy. The shaft 140 is configured to rotate about a rotor axis A, and the rotor back iron 210 and the plurality of magnetic elements 220, 230 are each concentrically arranged with respect to the rotor axis A As shown in FIG. 1, the rotor back 210 extends radially outwardly from the shaft 140, and the magnetic elements 220, 230 are supported on the rotor back iron 210 to extend radially outwardly from the rotor back iron 210.

The plurality of magnetic elements 220, 230 form an annular array around the rotor back iron 210. The plurality of magnetic elements 220, 230 comprises angular elements 220 and radial elements 230 in an alternating arrangement about the periphery of the rotor back iron 210. Each of the radial and angular elements is in the form of an angular segment of an annulus. The expressions "radial" and "angular" as used herein with respect to such elements relates to the orientation direction magnetisation, with the radial elements being provided to have a radial orientation direction between poles, and the angular elements being provided to have an angular orientation direction between poles (which may be an orientation direction corresponding to a local angular direction or a tangent to a local angular direction at the respective element).

A reference herein to a radial or angular element refers to those elements being provided to have such an orientation direction. As will become apparent from the further description below, the elements may be magnetised and demagnetised, and as such during application of the methods disclosed herein an element may be in a demagnetised state without a particular orientation direction, while still being referred to as an angular or radial element. Demagnetised elements may also retain their orientation direction when demagnetised.

In the example of FIG. 1, the radial and angular elements are provided to form a Halbach array. A Halbach array is a term of the art corresponding to a sequence of orientation directions for an array of adjacent magnetic elements, with advantages concerning augmentation of the magnetic field on one side of the array, and minimisation of the magnetic field on the opposing side of the array. For the purposes of the present disclosure in relation to an annular set of magnetic elements, a Halbach array may be defined by reference to the orientation directions of an alternating sequence of radial and angular magnetic elements. In particular, the Halbach array has a main side and an auxiliary side, with alternating radial elements having orientation directions towards the main side and auxiliary side respectively. The orientation directions of each angular element is always towards the adjacent radial element which has an orientation direction towards the main side.

The rotary machine 100 shown in FIG. 1 further comprises a magnet retention sleeve 150 disposed radially outwardly of the magnetic elements 220, 230, and a stator lamination stack 110 disposed radially outwardly of the rotor and incorporating windings. In this example, a rotor is formed by the plurality of magnet elements 220, 230 mounted on the shaft 140, together with the rotor back iron 210 and the retention sleeve 150. In this example, a stator is formed by the stator lamination stack 110 and the windings, which is separated from the rotor by an air-gap 120.

It will be appreciated that FIG. 1 illustrates an example rotary machine, and that the arrangements and methods disclosed herein are more generally applicable to a rotary machine or rotor comprising magnetic elements, preferably to magnetic elements arranged to form a Halbach array.

The disclosure relates to methods and apparatus for selectively magnetising and demagnetising a subset of the magnetic elements 220, 230 that form an annular array of magnetic elements.

As discussed above, while it is known to magnetise an entire annular set of magnetic elements simultaneously (e.g. by pulse magnetisation), there are also disadvantages to such an approach. These include the amount of energy required, and the complexity and expense of providing magnetisation equipment that circumscribes the full rotor. The methods and apparatus disclosed below permit a subset of the magnetic elements 220, 230 to be selectively magnetised or demagnetised at a time, for example one or more of the magnetic elements. This may permit maintenance (e.g. removal and/or replacement) of one or more of the subset, without requiring corresponding demagnetisation of all the magnetic elements of the plurality.

The methods and apparatus disclosed below relate to controlling magnetic flux (e.g. controlling) for a magnetisation or demagnetisation effect in the subset of elements, while inhibiting the magnetisation or demagnetisation effect in the remaining elements (i.e. the remaining elements of the plurality, not belonging to the subset).

To aid the related further discussion, the expression "primary" is to be used with respect to elements where a magnetisation or demagnetisation effect is to be directed, whereas the expression "secondary" is to be used with respect to an adjacent element where the respective effect is to be inhibited.

Figure 2:
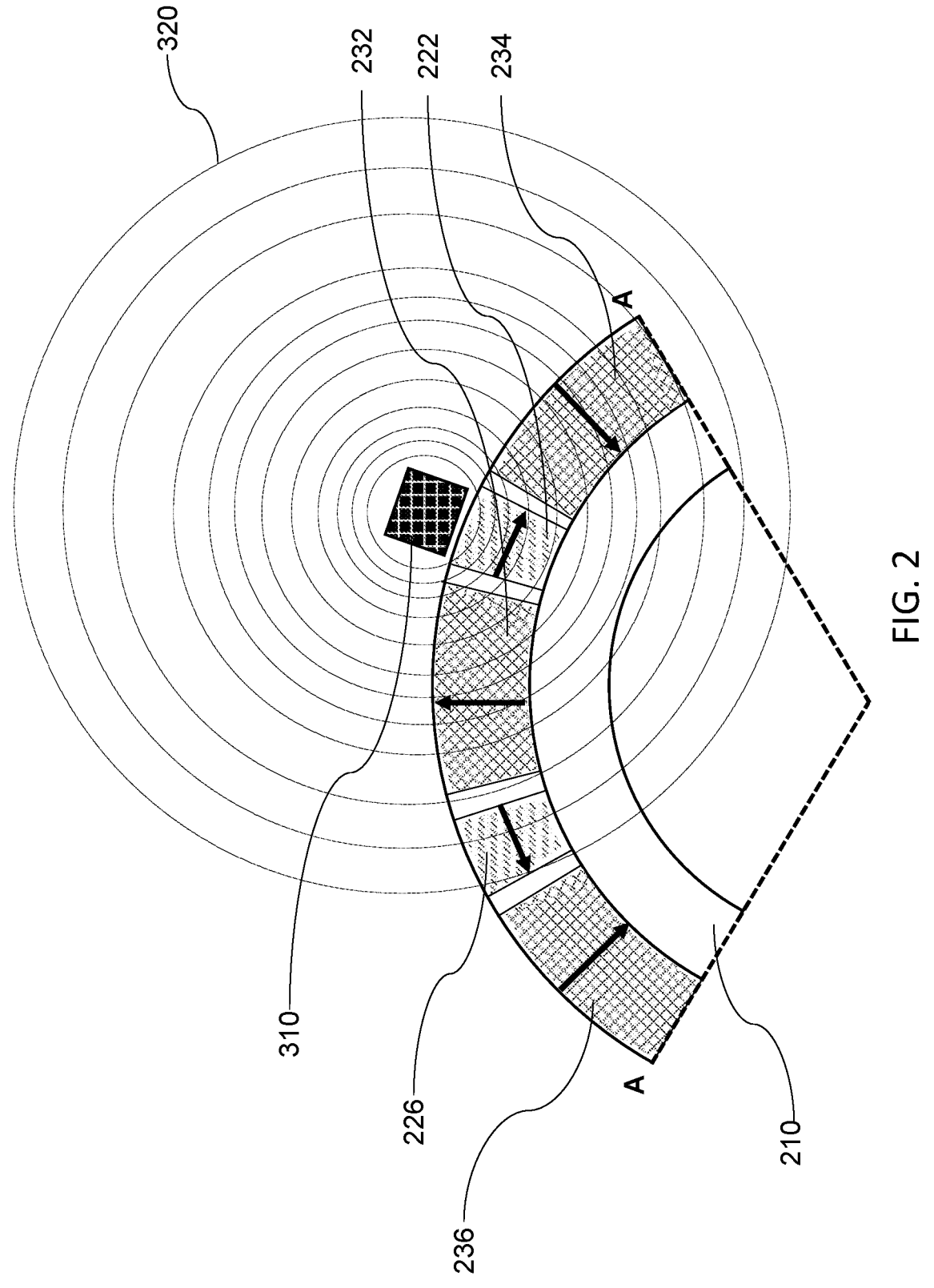
FIG. 2 is a sectional front view of the rotor (A-A) of FIG. 1 provided with a magnetizer for inducing flux in magnetic elements of the rotor.

FIG. 2 shows a partial cross-sectional view of an annular segment of the plurality of magnetic elements disposed on the rotor back iron 210, together with a magnetizer 310.

In the arrangement of FIG. 2, the magnetizer 310 is disposed radially outside of the magnetic elements, at an angular location (with respect to an axis of the rotor) corresponding to a primary angular element 222.

FIG. 2 also depicts the orientation directions corresponding to the magnetic elements, with radial arrows corresponding to radial elements and angular arrows (or arrows tangent to a local angular direction) corresponding to angular elements. In this example, the orientation directions correspond to a Halbach array.

The radial elements adjacent to the primary angular element are referred to herein as primary radial elements 232, 234. The primary magnetic elements 222, 232, 234 (comprising the primary angular element and the or each primary radial element) is referred to herein as the primary set of magnetic elements.

As shown in FIG. 2, the magnetizer 310 causes a magnetic field 320 centred on the magnetizer 310, which corresponds to magnetic flux being induced in magnetic elements of the annular component.

In this example arrangement, with the magnetizer 310 disposed at the angular location corresponding to the primary angular pole element 222, the resulting field lines of the magnetic field 320 correspond to the orientation directions of the primary set of magnetic elements 232, 222, 234. In particular, while the field lines are clearly curved, they are generally aligned with the angular direction in the primary angular element, and generally aligned with the radial direction in the primary radial elements. The field lines may correspond to the respective orientation direction for a magnetic element when the angle between the orientation direction and the field line is less than an angle between the field line and an orthogonal orientation direction (where the orthogonal direction is a radial direction for an angular element, and is the angular direction for a radial element).

FIG. 2 schematically shows how the field lines of the magnetic field do not correspond with the orientation directions for other magnetic elements adjacent to the primary set, in particular a secondary angular pole element 226 adjacent to the primary radial element 232. In contrast, the field lines 320 are substantially perpendicular to the pole orientation. This may cause the respective magnetic element (s) to be incorrectly magnetised or demagnetised. Further, while the field lines do not correspond with the orientation direction of a secondary angular pole element 226, for other elements the field lines may be aligned but the magnetising effect may be opposite to the intended orientation direction.

For example, it is apparent from FIG. 2 that further magnetic field lines beyond those shown would generally be aligned with the orientation direction for a secondary radial element 236 adjacent to the secondary angular element 226, but the magnetising effect may be opposite. Accordingly, when magnetised, the element 236 may be partially demagnetised; and when de-magnetised, the element 236 may be magnetised in the wrong direction.

FIG. 2 shows the magnetizer 310 disposed at a radial location relative to the magnetic elements so that the magnetizer is radially spaced apart from the primary angular pole element 222 by a radial distance referred to herein as a field separation. It may be that the field separation is relatively low to promote field line turning at the interface between the primary angular element and the primary radial element(s). In particular, if the field separation is relatively high, then the field lines may turn through a relatively low angle as they extend through the primary radial element(s) and the primary angular element; whereas the field lines may turn through a relatively higher angle when the field separation is relatively low, permitting the field lines to correspond to the radial orientation direction in the radial element(s), and to correspond to the angular orientation direction in the angular element(s). It may be that the field separation is not more than three times the radial thickness of the primary angular element 222, for example no more than twice the radial thickness of the primary angular element 222 or no more than the radial thickness of the primary angular element. In other examples arrangements, the field separation may be greater. The disclosure envisages placing a sleeve (e.g. a non-magnetic sleeve) between the magnetizer and the respective magnetic element, and it may be that the radial thickness of the sleeve corresponds to or is less than the field separation.

Figure 3:
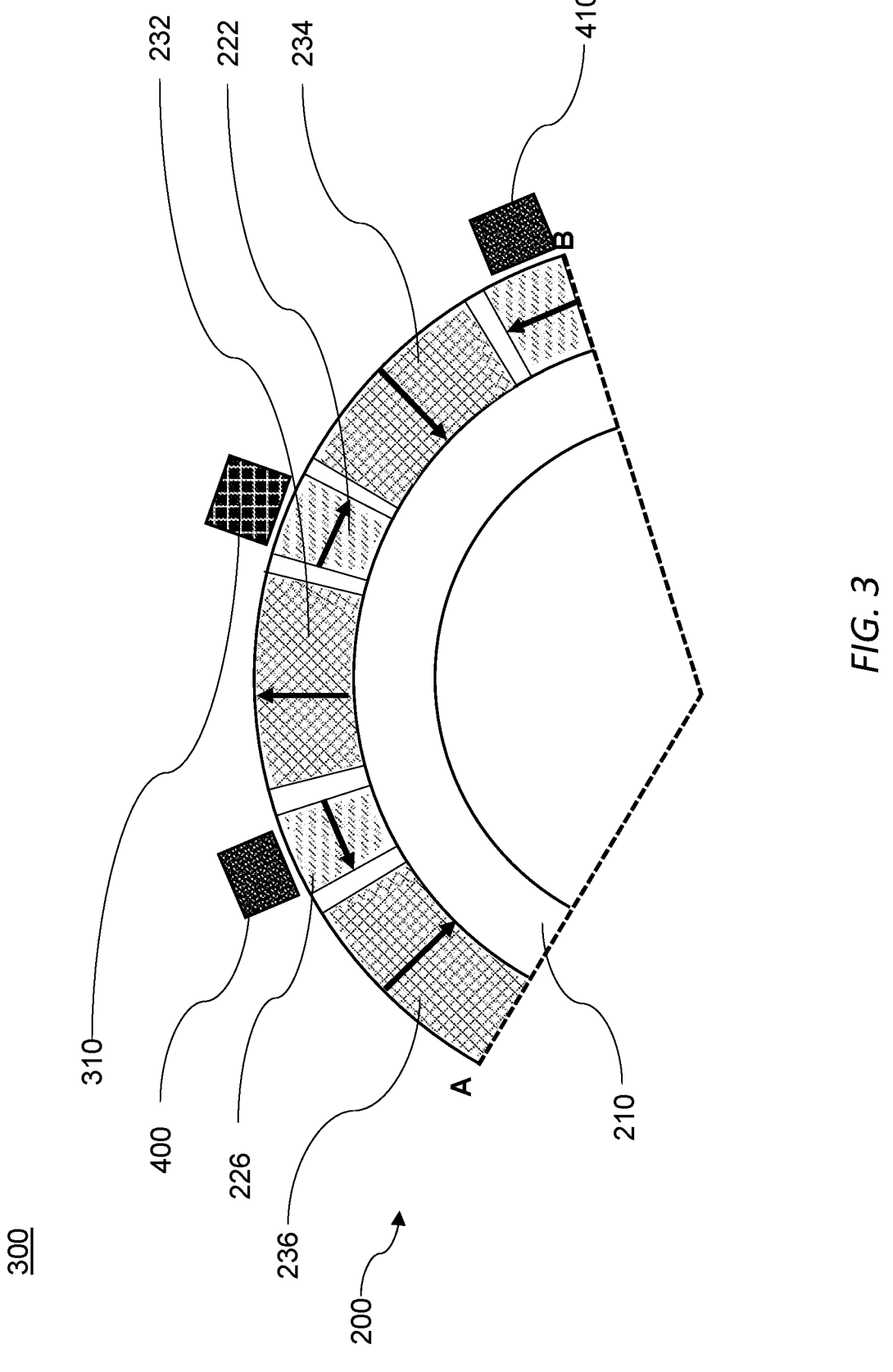
FIG. 3 is a sectional front view of the rotor (A-B) of FIG. 1 provided with a magnetizer and two shield elements.

FIG. 3 shows a magnetising arrangement 300 which corresponds to the arrangement described above with respect to FIG. 2, but in which a shield element 400 is provided and disposed at an angular location corresponding to a secondary angular element 226 which is adjacent to the primary radial element 232. In this example, there are primary radial elements on both anticlockwise and clockwise sides of the primary angular element 222, and consequently there may be two corresponding secondary angular elements at respective clockwise and anticlockwise locations. The shield element 400 in FIG. 3 is disposed at an anticlockwise location relative to the primary angular element 222 and the magnetiser 310. There may optionally be a further shield element 410 disposed at a corresponding clockwise secondary angular element, as in the example of FIG. 3.

In the example of FIG. 3, the shield elements 400, 410 are disposed radially outward of the secondary angular pole elements 226. In other examples, the shield element(s) 400, 410 may be disposed radially inwardly of a secondary angular pole element 226. A radially outward configuration for the shield element(s) may be more practical and convenient for a rotor, but for other annular components a radially-inward configuration may be more practical and convenient.

As shown in the example of FIG. 3, each shield element 400, 410 has a rectilinear for example square, cross-section normal to the axis of the rotor. However, a shield element may have any suitable cross-sectional shape.

In the example of FIG. 3, each shield element 400, 410 is provided in the form of a busbar having an extent along the rotor axis A. The disclosure envisages a rotor comprising a plurality of annular rotor stacks, each rotor stack comprising an annular arrangement of magnetic elements as described herein. The annular arrangements of magnetic elements may be angularly offset over the stacks, for example such that there is an angular offset between corresponding angular elements having the same (angular) orientation direction. In such arrangements, the shield element may be have a shape corresponding to the offset between stacks, for example with angularly-offset portions corresponding to respective rotor stacks. The shield element may have a stepped (e.g. zig-zag) or continuous (e.g. helical) angular offset along the rotor axis A. The angular offset may be configured so that the angular position of the shield element along the rotor axis corresponds to an angular offset between corresponding elements of the rotor stacks, for example to correspond to the angular location of an angular element (e.g. a secondary angular element) as described above. The shield element(s) 400, 410 and magnetiser 310 may be provided on a common support structure, such as a support frame, which is configured to maintain the shield element(s) 400, 410 and magnetiser 310 at predetermined relative locations. The common support structure may be configured to maintain the shield element(s) 400, 410 and magnetiser 310 at a substantially equal radial location relative to a support axis of the support structure, and at an angular separation relative to the support axis which corresponds to the angular separation of the magnetiser 310 and shield element(s) for use in a magnetising or demagnetising operation as described herein (e.g. at angular locations corresponding to primary and secondary angular elements of a component as described herein). The common support structure may be configured to receive an annular component having a central axis (e.g. a rotor axis as described herein) along the support axis, such that when the central axis and support axis are coincident the magnetiser and shield element(s) are positioned to perform the respective demagnetisation or magnetisation operations. The support structure may be configured to angularly rotate the magnetiser and shield element(s) together around the support axis for conducting such operations with respect to selected sets of magnetic elements. The support structure may be configured to permit repositioning of the magnetiser and shield elements at various angular locations corresponding for conducting such operations with respect to selected sets of magnetic elements.

In the arrangements shown in FIG. 1-FIG. 4 there is an angular gap (e.g. an air gap) formed between adjacent magnetic elements of the annular component 200. For example, there is an angular gap formed between the secondary angular element 226, and the adjacent primary radial element 232. The shield element 400, 410, being disposed at an angular location corresponding to the secondary angular element 226 that is adjacent to the primary radial pole element 232, 234, may have an angular boundary corresponding to an angular location of one of the angular gaps, for example the angular gap between a secondary angular pole element 226 and the adjacent primary radial pole element 232, 234. The angular gap may be relatively small, for example no more than 2 mm, no more than 1 mm or no more than 0.5 mm. In some examples, the angular gap may be larger, including when the angular gap is filled with a spacer element, for example a polymer insert. There may be substantially no angular gap (e.g. no angular gap).

The shield element 400, 410 may have a boundary corresponding to the angular surface of the secondary angular pole element 226 (i.e. the surface which faces the adjacent primary radial pole element 232, 234).

The shield element 400, 410 may have a boundary corresponding to the surface of the primary radial pole element 232, 234 facing the adjacent secondary angular pole element 226.

In other arrangements, there may be no such angular gap formed between adjacent magnetic elements, as such, there may be a contact interface between a primary radial pole element 232 and a secondary angular pole element 226. In such examples, the shield element 400,410 may have a boundary at the angular location of the interface.

The shield element 400,410 is configured to inhibit magnetic flux from the magnetizer at the angular location corresponding to the shield element, including the magnetic element at that location, which is the secondary angular element 226 in the example of FIG. 3. The shield element 400, 410 may further inhibit magnetic flex at angular locations beyond the shield element (e.g. on an opposite side of the shield element away from the magnetizer), for example the secondary radial element 236 as discussed above. A shield element may be configured to have that effect in a number of different ways relying on associated magnetic principles.

For example, a shield element may have a higher electrical conductivity (or lower electrical resistivity) than the or each corresponding magnetic element of the respective component (e.g. higher than the primary radial element(s) 232, 234. Without wishing to be bound by theory, it is considered that a shield element having a higher electrical conductivity (or lower electrical resistivity) than the respective magnetic element(s) can inhibit local magnetic flux owing to eddy currents. In particular, when disposed in the electric field corresponding to the magnetiser, eddy currents will form in a conductive shield element, and those eddy currents will generate their own magnetic flux that opposes the flux corresponding to the magnetizer, to provide a cancelling effect to significantly reduce (inhibit) the local flux at the angular location of the shield element. Accordingly, when visualised with the common concept of magnetic flux lines, the shield element may be considered to have the effect of inhibiting magnetic flux through at the angular location corresponding to the shield element, and concentrating magnetic flux in the angular location between the magnetiser and the shield element.

The shield element 400, 410 may comprise (e.g. consist of) copper (or a copper alloy) or aluminium (or an aluminium alloy), whereas the magnetic elements may comprise (e.g. consist of) permanent magnet material, for example rare earth permanent magnetic material such as Nedymium-Iron-Boron alloys (Nd—Fe—B) or Samarium-Cobalt alloys (Sm—Co). Example commercially available permanent magnets may be selected from the VACODYM® and VACOMAX® ranges available from VacuumSchmelze GmbH & Co. KG (VAC) of Hanau, Germany. By way of example, a typical electrical resistivity for such Nd—Fe—B alloys may be in the range 1.2-1.6 µOhm·m (electrical conductivity between 0.62-0.83 MS/m; and a typical electrical resistivity for such Sm—Co alloys may be 0.4-0.9 µOhm/m (electrical conductivity of approximately 1.1-2.5 MS/m) (datasheet available at https://web.archive.org/web/20230118143719/https://vacuumschmelze.com/03_Documents/Brochures/VACODYM-VACOMAX % 20en.pdf-see page 18). Other permanent magnet materials are known and may have electrical conductivities which are lower than the electrical conductivity of a selected shield material, for example less than MS/m, or between 0.1-30 MS/m, for example between 0.1-10 MS/m, 0.1-5 MS/m, or 0.5-5 MS/m, or 0.5-2.5 MS/m. For example, NdFeB magnets available from Bunting Magnetics, UK, may have an electrical conductivity of approximately 0.1 MS/m (datasheet available at/web/20230118142624/https://e-magnetsuk-.com/introduction-to-neodymium-magnets/characteristics-of-ndfeb-magnets/) Copper has an electrical conductivity of 58 MS/m, and aluminium has an electrical conductivity of 35 MS/m. The shield element is not limited to comprising copper or aluminium, and may comprise any material or combination of materials which result in a shield element 400, 410 having a relatively higher electrical conductivity (or relatively lower electrical resistivity) than that of the or each magnetic element disposed about the periphery of the annular component 200.

Similarly, it may be that the shield element has a relatively higher thermal conductivity than the or each magnetic element. The thermal conductivity is related to the flux-inhibiting effect because a relatively high thermal conductivity permits heat generated by the induced eddy current to dissipate, and the electrical conductivity that provides the shielding effect may reduce if heat is not dissipated.

Figure 4:
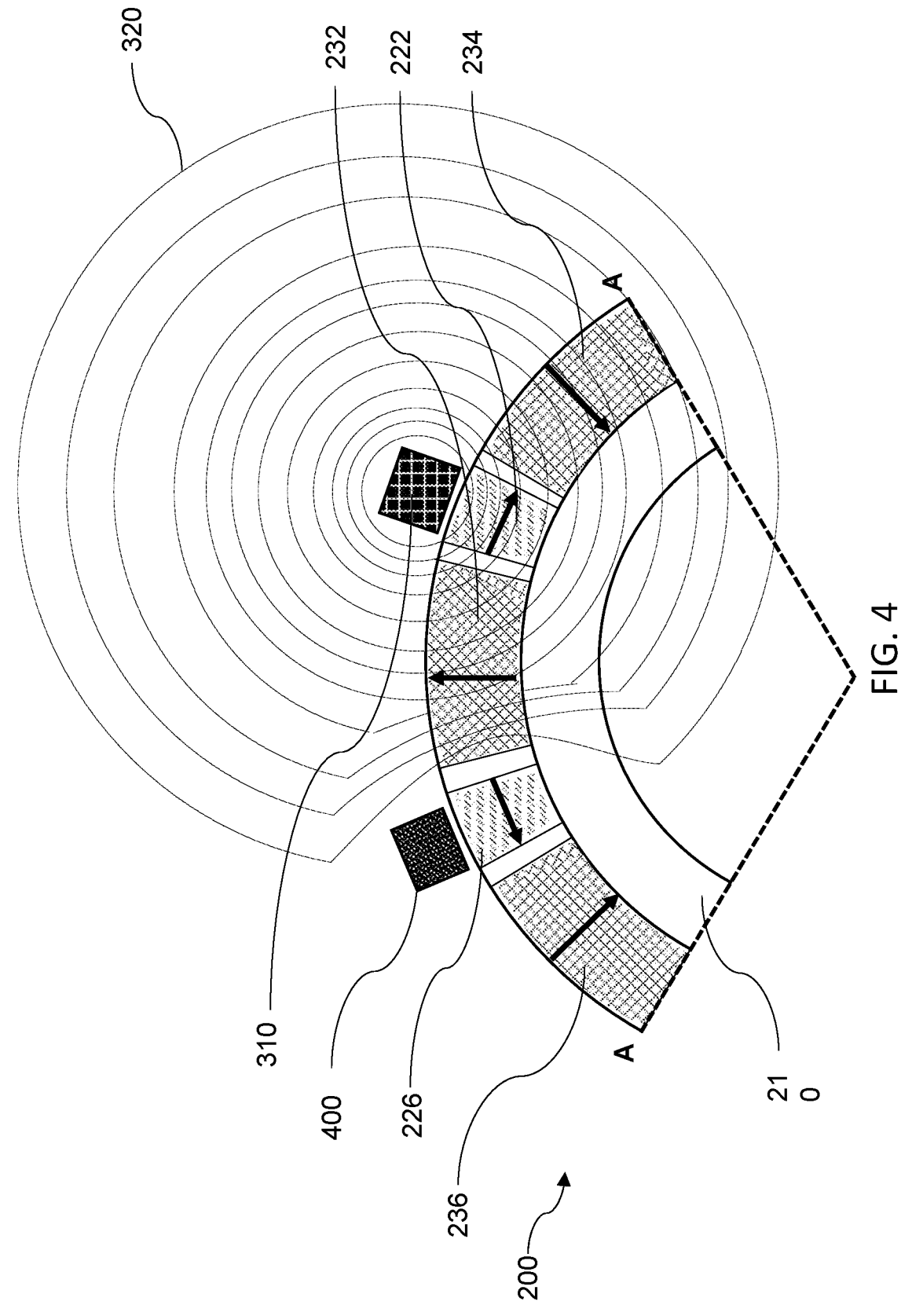
FIG. 4 is a sectional front view of the rotor (A-A) of FIG. 1 provided with a magnetizer and shield element, with illustrated magnetic field lines.

FIG. 4 schematically shows the flux-inhibiting effect of the shield element 400, illustrated with respect to magnetic field lines associated with the magnetiser. As shown and in comparison with FIG. 2, the shield element has the effect of re-directing the field lines 320, such that the shield element may be considered to be configured to present an angular barrier that inhibits magnetic flux, and may therefore inhibit (e.g. substantially reduce) magnetic flux in the secondary angular element 226. As such, the magnetizer 310 and shield element 400 are together configured to concentrate an induced magnetic flux in the primary set of magnetic elements of the annular component.

By re-directing the field lines 320 (e.g. as compared with those of FIG. 2), the shield element 400 may cause the orientation of the field lines 320 passing through the primary radial elements 232, 234 to more closely correspond to the orientation direction of the primary radial elements 232, 234, in particular so that the local direction of the field lines is angularly offset from the local radial direction by a smaller amount, compared to the corresponding angle in the absence of the shield element(s). The shield element 400 may therefore concentrate/increase the magnetic flux in the primary set of magnetic elements 222, 232, 234, and may reduce the magnetic flux from the adjacent secondary angular pole elements 226.

By concentrating and/or improving an orientation of magnetic flux in magnetic elements for a magnetising or demagnetising effect, the magnetiser and shield element of the invention permits selective magnetisation and demagnetisation of magnet elements of a rotary machine.

The option to selectively demagnetize (and magnetise) a rotary machine 100, for example by demagnetising one set of magnetic elements at a time, facilitates easier inspection and safer disassembly of rotary machines 100. Selective demagnetisation and magnetisation permits selective disassembly (e.g. removal of a subset of the magnetic elements) without the hindrance of working against strong magnetic forces. The selective demagnetisation and magnetisation also reduces a requirement for specialist tooling required for handling and manipulating components (e.g. the magnetic elements) in the presence of strong magnetic forces. In contrast, more conventional or COTS (commercial off-the-shelf) tools may be used.

Furthermore, in the event that a limited repair or inspection is required, for example on one or a subset of magnetic elements of the component, the respective set of magnetic elements may be identified and demagnetized in isolation;

rather than the user needing to demagnetize the entirety of the rotary machine to repair/inspect that one set of magnetic elements.

In addition to advantages associated with component handling, removal and repair, there are also advantages associated with the provision of the magnetising equipment.

In particular, the power and current draw for selectively demagnetising/magnetising a subset of the magnetic elements of a component is commensurately lower than the power and current draw for demagnetising/magnetising a full annular component. Accordingly, the magnetising equipment may be configured and rate for lower electrical loads. Yet further, a lower number of magnetisers may be required, for example only one magnetiser, as compared with an array of magnetisers for demagnetisation/magnetisation of an annular component.

Similar principles and advantages apply with respect to magnetisation (e.g. re-magnetisation).

Although an example has been described in which there are two shield elements associated with one magnetiser, in other arrangements there may be only one shield element disposed at an angular location corresponding to a secondary angular pole element that is adjacent to a primary radial pole element.

FIG. 5 is a flowchart showing steps of a method for demagnetising a primary set of magnetic elements of an annular component of a rotary machine, and will be described with reference to the example of FIGS. 3 and 4.

In step 402, a primary set of magnetic elements to demagnetize is identified, for example comprising a primary angular element and one or two primary radial elements. In step 404, a shield element is disposed at an angular location corresponding to a secondary angular pole element that is adjacent to a primary radial pole element. Preferably, and as shown in FIG. 3, in step 404, two shield elements are disposed at angular locations corresponding to secondary angular pole elements adjacent to the primary radial pole elements.

The shield element(s) may be disposed radially outwardly or radially inwardly of the corresponding secondary angular pole element.

In step 406, a magnetizer is disposed at an angular location corresponding to a primary angular pole element. In step 406, the magnetizer may further be disposed relative to the primary angular pole element so that the centre of the field lines of the magnetic field from the magnetizer is radially spaced apart from the primary angular pole element by a field separation. The field separation may not be more than twice the radial thickness of the primary angular pole element.

For example, the field separation may not be limited to twice the radial thickness of the primary angular pole element. Steps 404 and 406 can be conducted in any order. In step 408, the magnetizer is caused to induce a magnetic flux in the rotor components of the annular component, thereby demagnetizing the primary set of magnetic elements in a demagnetising operation. Due to the presence of the shield element, the magnetizer induces a magnetic flux which is concentrated in the primary set of magnetic elements, whilst the magnetic flux in secondary angular pole elements is inhibited. For example, the magnetic flux may be caused by providing a short duration pulse of electrical power through a magnetising coil of the magnetizer, which may be provided from a capacitor or capacitor bank, with a non-sinusoidal wave-form. In step 410, following a demagnetisation operation, the user may disassemble and/or uninstall one or more of elements of the primary set from the rotary machine. The disassembled or removed element may subsequently be returned, or a replacement may be reinstalled. Additionally or alternatively, in step 410, the user may inspect and/or repair the primary set of magnetic elements. Additionally or alternatively, in step 410, the user may carry out any process or procedure on the demagnetized primary set of magnetic elements, for example a maintenance procedure.

The method 400 may be repeated to demagnetize one or more further sets of magnetic elements from the annular component of the rotary machine, each set being considered a respective "primary set" with respect to each further demagnetisation operation.

FIG. 6 is a flowchart showing steps of a method for magnetising a primary set of magnetic elements of an annular component of a rotary machine.

Optionally in step 502, a set of demagnetized magnetic elements are installed onto the annular component of the rotary machine, for example corresponding to a primary set of magnetic elements as described herein. Otherwise, such magnetic elements may already be in place on the rotary machine. In step 504, a primary set of magnetic elements to magnetize is identified, for example comprising a primary angular element and one or two primary radial elements as described herein.

In step 506, a magnetizer is disposed at an angular location corresponding to the primary angular element. In step 506, the magnetizer may further be disposed relative to the primary angular pole element so that the centre of the field lines of the magnetic field from the magnetizer is radially spaced apart from the primary angular pole element by a field separation. The field separation may not be more than twice the radial thickness of the primary angular pole element. For example, the field separation may not be limited to twice the radial thickness of the primary angular pole element.

In step 508, a shield element is disposed at an angular location corresponding to a secondary angular element that is adjacent to a primary radial pole element. Preferably, and as shown in FIG. 3, in step 508, two shield elements are disposed at angular locations corresponding to secondary angular pole elements adjacent to two primary radial pole elements.

The shield element may be disposed radially outwardly or radially inwardly of the corresponding secondary angular element.

Steps 506 and 508 may be conducted in any order.

In step 510, the magnetizer is caused to induce a magnetic flux in the rotor components of the annular component, thereby magnetizing the primary set of magnetic elements in a magnetisation operation. The polarity of the magnetic flux may be opposite to that of a magnetic flux that may be induced for demagnetisation. Due to the presence of the shield element, the magnetizer concentrates the magnetic flux in the primary set of magnetic elements, whilst the magnetic flux in secondary angular pole elements is inhibited.

The method 500 may be repeated for further sets (primary sets) of magnetic elements of the annular component.

FIG. 7 shows a flux assembly 700 for a flux arrangement, for example as described above with respect to FIG. 4 and FIG. 5. The flux assembly 700 comprises a magnetiser 310 and a shield element 400 corresponding to those described above, mounted to a common support structure. FIG. 7 illustrates how the magnetiser 310 and shield element 400 are mutually arranged to be disposed relative to (e.g. around) an annular component, a location for which is indicated by the dashed line. The flux assembly has a support axis 710 along which it is configured to receive an annular component to be disposed radially within the magnetiser and the shield element. In this example, the support axis 710 is defined as a central axis of a cylindrical datum surface that intersects or opposes the magnetiser 310 and shield element 400, as shown by the dashed line in FIG. 7.

The magnetiser 310 and shield element 400 are disposed at positions which may correspond to angular locations of a primary angular element and a secondary angular element respectively. (e.g. by suitable positioning for a particular annular component).

As disclosed elsewhere herein, the flux assembly may comprise one or more further magnetiser(s) and one or more further shield elements.

The magnetising arrangements described elsewhere herein (i.e. including an annular component, magnetiser(s) and shield element(s)) may comprise a flux assembly as described by way of example with respect to FIG. 7. In particular, such magnetising arrangements may comprise a common support structure which determines the relative position of the magnetiser(s) and shield element(s).

The arrangements disclosed herein have advantages concerning flux leakage prevention, and in particular provide a means to prevent flux leakage with minimal equipment complexity and cost. The arrangements disclosed herein can achieve the magnetising and de-magnetising effects described herein with only one magnetizer (e.g. one magnetizer at an angular location, for example one magnetizer coil), avoiding additional equipment complexity, cost, and energy use associated with multi-coil or multi-magnetiser arrangements. Multi-coil arrangements may also require specific calibration and design of coils tailored to a shape and size of a magnetic element to mitigate flux leakage, whereas the arrangements disclosed herein mitigate flux leakage using a shield disposed at an appropriate angular location, and is considered to be more adaptable for magnetising and de-magnetising components of various shapes and sizes.

The inventors have also found that providing the shield element significantly reduces mechanical stress in a coil of the magnetiser during a magnetising or de-magnetising operation.

As mentioned elsewhere herein, the use of the shield element localises a magnetising or de-magnetising effect, permitting a sequential or partial magnetising or de-magnetising operation applied to a subset of magnetic elements of a larger component, thereby reducing a peak energy requirement for the magnetising or de-magnetising operation compared to arrangements which act on all elements of a component.

The invention claimed is:

1. A method of magnetising or demagnetising an annular component for a rotary machine, the annular component comprising an alternating arrangement of radial elements and angular elements for forming a Halbach array in which the elements have respective radial and angular magnetic orientation directions, the method comprising:

causing a magnetizer to induce magnetic flux in a primary set of elements of the annular component comprising a primary radial element and an adjacent primary angular element;

wherein the magnetizer is disposed at an angular location corresponding to the primary angular element; and a shield element shielding a secondary angular element of the annular component from magnetic flux from the magnetizer;

wherein the secondary angular element is adjacent to the primary radial element, and wherein the shield element is disposed at an angular location corresponding to the secondary angular element.

2. The method claim 1, wherein the shield element is disposed radially outward of the secondary angular element.

3. The method of claim 1, wherein the primary set of elements of the annular component comprises the primary angular element and a plurality of primary radial elements.

4. The method of claim 1, wherein the shield element comprises a shield material and each of the plurality of radial and angular elements of the component comprises a respective pole material;

wherein the electrical conductivity of the shield material is greater than the electrical conductivity of the pole material of the primary radial element disposed between the primary angular element and the secondary angular element.

5. The method of claim 1, wherein the shield element has an electrical conductivity of at least 9 MS/m.

6. The method of claim 1, wherein the shield element comprises a shield material and each of the plurality of radial and angular elements of the component comprises a respective pole material;

wherein the thermal conductivity of the shield material is greater than the thermal conductivity of the pole material of the primary radial element disposed between the primary angular element and the secondary angular element.

7. The method of claim 1, wherein the shield element has a thermal conductivity of at least 50 W/m K.

8. The method of claim 1, wherein there is an interface between the primary radial element and the secondary angular element, and wherein the shield element has a boundary at an angular location corresponding to the interface.

9. The method of claim 1, where the primary angular element has a radial thickness; and wherein the magnetizer is radially spaced apart from the primary angular element by a field separation; and wherein the field separation is no more than twice the radial thickness of the primary angular element.

10. The method of claim 1, wherein the magnetizer is caused to induce magnetic flux to demagnetize the primary set of elements in a demagnetisation operation; the method further comprising:

conducting a maintenance operation for a maintenance element of the primary set of elements.

11. The method of claim 10, wherein the maintenance operation comprises:

removing the maintenance element; and re-installing the maintenance element or installing a replacement maintenance element; and wherein the method further comprises:

subsequently causing the magnetizer to induce a magnetic flux in the primary set of elements to magnetise the maintenance element in a magnetisation operation.

12. The method of claim 11, wherein at least some radial or angular elements of the annular component remain in place without during the maintenance operation and the subsequent magnetisation of the maintenance element.

13. The method of claim 10, comprising a sequence of demagnetisation operations conducted for respective primary sets of elements of the annular component; and/or comprising a sequence of magnetisation operations conducted for respective primary sets of elements of the annular component.

14. A magnetising arrangement comprising:

an annular component for a rotary machine, the annular component comprising an alternating arrangement of radial elements and angular elements for forming a Halbach array in which the elements have respective radial and angular magnetic orientation directions;

a flux assembly comprising:

a magnetizer configured to induce a magnetic flux in the elements of the annular component; and a shield element;

wherein the magnetizer and shield element are angularly spaced apart with respect to a centroidal axis of the annular component;

wherein the shield element is configured to present a barrier to inhibit magnetic flux in the annular component at an angular location corresponding to the shield element;

wherein the flux assembly is configured to be disposed relative to the annular component so that, with the magnetizer at an angular location corresponding to a primary angular element and the shield element at an angular location corresponding to a secondary angular element, the magnetizer is configured to induce magnetic flux in a primary set of elements comprising the primary radial element and an adjacent primary angular element, with the shield element shielding the secondary angular element from the magnetic flux.

15. A magnetising arrangement according to claim 14, wherein the flux assembly comprises a common support structure which supports the magnetizer and the shield element, and is configured to receive the annular component radially within the magnetizer and the shield element so that the centroidal axis of the annular component is coincident with a support axis of the support structure.

16. A magnetising arrangement according to claim 15, wherein the magnetizer and the shield element are at a common radial position with respect to the support axis.

17. A flux assembly for a magnetising arrangement in accordance with claim 14.

* * * * *